(No Model.)
J. H. HEDGCOCK.
WAGON BRAKE.
No. 297,689. Patented Apr. 29, 1884.
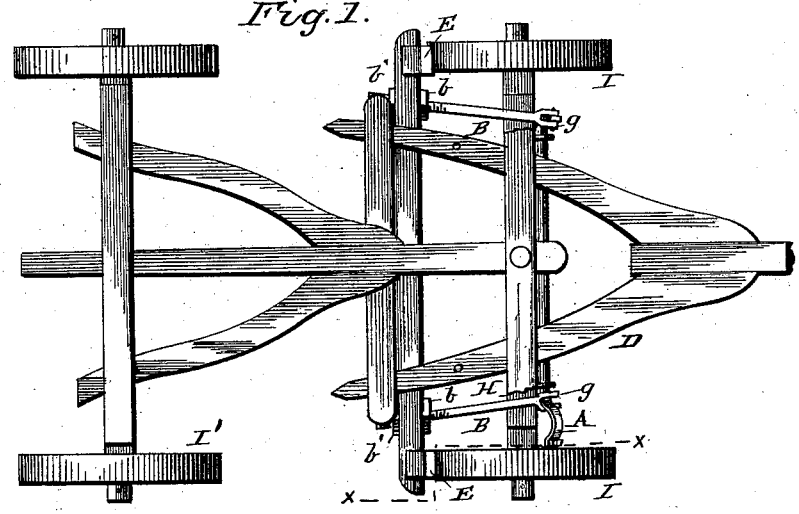
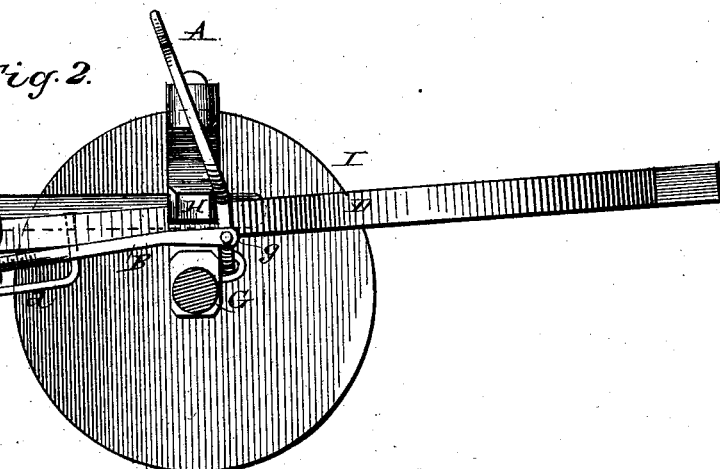
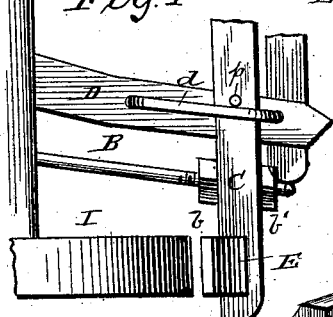
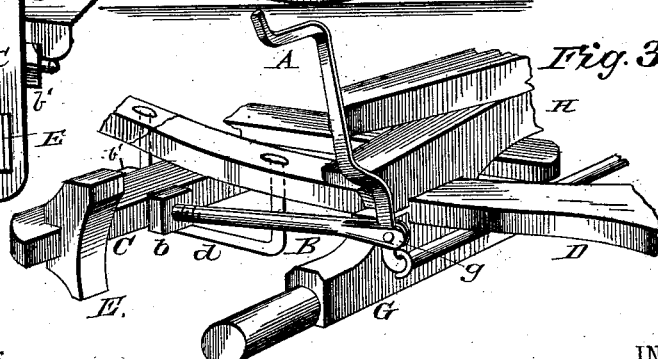
WITNESSES:
INVENTOR.
James H. Hedgcock
By
J. H. Macdonald & P. H. Tallmadge
ATTORNEYS.

UNITED STATES PATENT OFFICE.

JAMES H. HEDGCOCK, OF BRADFORD, TENNESSEE.

WAGON-BRAKE.

SPECIFICATION forming part of Letters Patent No. 297,689, dated April 29, 1884.

Application filed February 16, 1884. (No model.)

*To all whom it may concern:*

Be it known that I, JAMES HENDERSON HEDGCOCK, a citizen of the United States, residing at Bradford, in the county of Gibson and State of Tennessee, have invented certain new and useful Improvements in Wagon-Brakes, of which the following is a specification, reference being had therein to the accompanying drawings.

My invention relates to improvements in wagon-brakes; and it consists in certain details of construction and operation of the several parts, as will be hereinafter more fully set forth in the specification and claims, and pointed out in the accompanying drawings, in which—

Figure 1 is a plan view of the device; Fig. 2, a side elevation of same; Fig. 3, a detail perspective view of the brake mechanism, and Fig. 4 a plan view of the under part of the brake.

Similar letters of reference refer to similar parts in the several figures.

The brake is intended to hold the front wheels, and in order to accomplish this purpose, and for convenience, the brake lever is placed at the forward end of the wagon-bed. The brake-lever A may project upward through the bed of the wagon and close to the side, so as to be conveniently operated by the foot or hand of the driver. It is, however, preferable to have the brake come up close to the side of and outside of the bed, so as not to interfere with the operation thereof when the wagon-bed is filled. The brake A is bent or turned at a right angle, so as to run parallel to and be secured to the front axle, G, at a point near the spindle. The wagon-hounds D pass over the bent portion of the brake. At each end of the axle a split bolt, B, is pivoted or secured to the brake at a point, $g$. These bolts pass to the rear and through the brake-beam C, and are held by the washers or nuts $b\ b'$, which can be screwed up and tightened or loosened, so as to bring the brake-beam C and brake blocks or rubbers E nearer to or farther from the wheels I, as may be desired. In fact, when these rubbers or blocks E commence to wear and lose their friction on the wheels, it is only necessary to tighten the nuts $b\ b'$ and bring the blocks back to their full frictional capacity. In order to keep the brake-beam C from becoming displaced and the blocks E squarely in place, I place the rods $d$ at each end of the beam, and bring the ends up through the hounds D, Figs. 2 and 3. In order to prevent lateral movement of the beam, the bent rods $d$ abut against pins $p$, driven into the beam. When the brake-lever A is pushed forward, it draws forward brake-beam through the intervention of the swiveled bolt B, and is drawn forward along the rods $d$ as guides. This form of brake is not only convenient, but easily operated, and is easily manufactured and applied to a vehicle.

Having thus described my invention, what I claim is—

In a vehicle-brake, the combination of a lever, A, secured to the front of the axle, with the end bolts, B, adjustably secured to the brake-beam, and slotted in front, so as to embrace the lever, and the supporting-guides $d$, whereby the brake-beam is held in place and prevented from moving laterally, substantially as and for the purpose set forth.

In testimony whereof I affix my signature in presence of two witnesses.

JAMES H. HEDGCOCK.

Witnesses:
G. S. BARTON,
J. S. BRYANT.